United States Patent
Yoon et al.

(10) Patent No.: US 10,686,168 B2
(45) Date of Patent: Jun. 16, 2020

(54) METHOD OF MANUFACTURING SHORT-PREVENTIVE ALL-SOLID-STATE BATTERY

(71) Applicants: HYUNDAI MOTOR COMPANY, Seoul (KR); KIA MOTORS CORPORATION, Seoul (KR)

(72) Inventors: Yong Sub Yoon, Seoul (KR); Pil Gun Oh, Daejeon (KR); Oh Min Kwon, Busan (KR); Hong Seok Min, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 145 days.

(21) Appl. No.: 15/833,878

(22) Filed: Dec. 6, 2017

(65) Prior Publication Data

US 2018/0342710 A1    Nov. 29, 2018

(30) Foreign Application Priority Data

May 24, 2017  (KR) .................... 10-2017-0063847

(51) Int. Cl.
*H01M 2/02*  (2006.01)
*H01M 2/08*  (2006.01)
(Continued)

(52) U.S. Cl.
CPC ....... *H01M 2/0277* (2013.01); *H01M 2/0275* (2013.01); *H01M 2/0287* (2013.01); *H01M 2/065* (2013.01); *H01M 2/08* (2013.01); *H01M 10/0463* (2013.01); *H01M 10/0525* (2013.01); *H01M 10/0562* (2013.01)

(58) Field of Classification Search
CPC .. H01M 2/0275; H01M 2/0277; H01M 2/065; H01M 2/08; H01M 10/0463
See application file for complete search history.

(56) References Cited

U.S. PATENT DOCUMENTS

| 4,567,121 A * | 1/1986 | Gilmour | H01M 2/0404 29/623.2 |
| 2013/0344357 A1* | 12/2013 | Miyake | H01M 2/0267 429/82 |
| 2018/0212210 A1* | 7/2018 | Suzuki | H01M 2/0285 |

FOREIGN PATENT DOCUMENTS

| JP | 5347411 B2 | 11/2013 |
| JP | 5382130 B2 | 1/2014 |

(Continued)

OTHER PUBLICATIONS

"Hermetic." Dictionary.com, Dictionary.com, https://www.dictionary.com/browse/hermetic?s=ts. (Year: 2019).*

*Primary Examiner* — Rena Dye Cronin
(74) *Attorney, Agent, or Firm* — Morgan, Lewis & Bockius LLP (57) ABSTRACT

A method of manufacturing a short-preventive all-solid-state battery in which a thermosetting insulating resin applied in advance to a pouch-type electrode case provided with an electrode assembly received therein is forced to fill a space between the edges of the electrode assembly during packaging of the electrode assembly to fill vacant spaces between electrodes at the edges of the electrode assembly and may thus prevent physical contact and collision between the electrodes and fundamentally prevent generation of a short circuit caused thereby.

5 Claims, 5 Drawing Sheets

(51) Int. Cl.
_H01M 10/0562_ (2010.01)
_H01M 2/06_ (2006.01)
_H01M 10/04_ (2006.01)
_H01M 10/0525_ (2010.01)

(56) References Cited

FOREIGN PATENT DOCUMENTS

| | | |
|---|---|---|
| JP | 2014-116156 A | 6/2014 |
| KR | 10-1484369 B1 | 1/2015 |
| KR | 10-2016-0125703 A | 11/2016 |

\* cited by examiner

ion No. 10-2017-0063847 filed on May 24, 2017, the entire contents of which are incorporated herein by reference.

METHOD OF MANUFACTURING SHORT-PREVENTIVE ALL-SOLID-STATE BATTERY

CROSS-REFERENCE TO RELATED APPLICATION

This application claims under 35 U.S.C. § 119(a) the benefit of priority to Korean Patent Application No. 10-2017-0063847 filed on May 24, 2017, the entire contents of which are incorporated herein by reference.

BACKGROUND

(a) Technical Field

The present disclosure relates to a method of manufacturing a short-preventive all-solid-state battery. More particularly, it relates to a method of manufacturing a short-preventive all-solid-state battery in which short generated at the edges of an electrode assembly may be fundamentally prevented.

(b) Background Art

In general, a secondary battery is a type of electrical battery which is repeatedly charged and discharged by interchange between chemical energy and electrical energy through chemical reactions, such as oxidation and reduction, and includes four essential elements, i.e., a cathode, an anode, a separator film and an electrolyte.

A lithium secondary battery, which is being used nowadays, employs a liquid electrolyte. Since such a liquid electrolyte contains a combustible organic solvent, when external impact is applied to the liquid electrolyte or a cell, an uncontrollable environment in the battery is created, and a serious safety problem may occur. Thus, an additional material to improve the safety is required in addition to the essential elements of a battery cell, or an additional safety device is required.

An all-solid-state battery is a battery which includes a solid electrolyte instead of a liquid electrolyte used in a conventional lithium secondary battery and may assure safety by fundamentally solving safety problems of a conventional lithium secondary battery. Therefore, the all-solid-state battery is advantageous in that a cell safety device additionally provided to improve safety of the conventional lithium secondary battery may be omitted and thus energy density of each battery pack may be raised.

Further, the all-solid-state battery may employ next generation high performance electrodes, such as a lithium anode, a high voltage cathode such as a sulfur cathode, etc., which are not applicable to the conventional lithium secondary battery, to overcome performance limitations of the conventional lithium secondary battery, and implement a high voltage cell having a high energy density employing a bipolar electrode in which cathodes and anodes are stacked in series using stability of a solid electrolyte.

In such an all-solid-state battery, the solid electrolyte serves as a separator film for physical separation between electrodes instead of the liquid electrolyte of the conventional lithium secondary battery and, in order to prevent lithium precipitation, the application area of an anode active material must be greater than that of a cathode active material. Such a structure may easily cause deformation of the electrode assembly via a process of manufacturing the electrode assembly including stacking cathodes and anodes and a subsequent process of pressing the electrode assembly, and cause high possibility of generating short due to physical contact between the cathode and the anode.

PRIOR ART DOCUMENT

Patent Document

Korean Patent Laid-open Publication No. 10-2016-0125703

SUMMARY

The present invention has been made in an effort to solve the above-described problems associated with the prior art and it is an object of the present invention to provide a method of manufacturing a short-preventive all-solid-state battery in which a thermosetting insulating resin applied in advance to a pouch-type electrode case provided with an electrode assembly received therein is forced to fill a space between the edges of the electrode assembly during packaging of the electrode assembly to fill vacant spaces between electrodes at the edges of the electrode assembly and may thus prevent physical contact and collision between the electrodes and fundamentally prevent generation of a short circuit caused thereby.

In one aspect, the present invention provides a method of manufacturing a short-preventive all-solid-state battery, including applying an insulating resin to the inner surface of at least one exterior member out of a pair of exterior members, and disposing an electrode assembly between the pair of exterior members and bonding the edges of the exterior members so as to seal the electrode assembly, wherein, when the edges of the exterior members are bonded, the insulating resin applied to the inner surface of the at least one exterior member is forced to fill a space between the edges of the electrode assembly.

In a preferred embodiment, disposition of the electrode assembly between the pair of exterior members and bonding of the edges of the exterior members so as to seal the electrode assembly may include primarily sealing the electrode assembly by hermetically bonding primary sealing area of the edges of the pair of exterior members so as to form a pouch-type electrode case received the electrode assembly, and secondarily sealing the electrode assembly by pressing areas adjacent to the primary sealing areas of the exterior members, bonded in primarily sealing, by applying pressure thereto, and, in secondary sealing, the insulating resin, applied to the area adjacent to the primary sealing area of the at least one exterior member, may be forced to fill a space between the edges of the electrode assembly to fill vacant spaces between electrodes at the edges of the electrode assembly.

In another preferred embodiment, the insulating resin may be applied to the entirety of the inner surface of the at least one exterior member or applied to the edge of the inner surface of the at least one exterior member. Further, the insulating resin may be applied only to a designated area of the inner surface of the at least one exterior member, and the designated area may include a secondary sealing area of the at least one exterior member corresponding to an area between the primary sealing area of the at least one exterior member and the edges of the electrode assembly.

In still another preferred embodiment, the method may further include pressing the electrode assembly by applying pressure thereto in an electrode stacking direction, after disposition of the electrode assembly between the pair of exterior members and bonding of the edges of the exterior members.

The present disclosure also discloses another method of manufacturing a short-preventive all-solid-state battery, the method includes applying an insulating resin to an inner surface of at least one of a pair of exterior members, disposing an electrode assembly between the pair of exterior members, hermetically bonding primary sealing area of the edges of the pair of exterior members, and pressing areas adjacent to the primary sealing area of the exterior members bonded in primarily sealing so that the insulating resin, applied to the area adjacent to the primary sealing area of the at least one exterior member, is forced to fill vacant spaces between electrodes protruding from the edges of the electrode assembly. The insulating resin is simultaneously hardened during the pressing the areas adjacent to the primary sealing area, so that the hardened insulating resin stably supports the electrodes protruding from the edges of the electrode assembly.

The pressing the areas adjacent to the primary sealing area may be performed through thermal fusion by a high-temperature sealing device including metal sealing bars.

The insulating resin may include a thermosetting polymer. The thermosetting polymer may include at least one of epoxy resin, epoxy novolac resins, benzoxazines, polyimides, bismaleimides, cyanate esters, polycyanurates, vinyl ester, polyester resin, polyurethanes, polyurea/polyurethane hybrids, vulcanized rubber, bakelite, phenol-formaldehyde resin, duroplast, urea-formaldehyde, melamine resin, diallyl-phthalate (DAP), furan, and silicone. The thermosetting polymer may be in a form of composite which includes a reinforced fiber. The reinforced fiber may be made of electrically insulating material such as glass fiber.

The present disclosure also discloses a short-preventive all-solid-state battery which may includes an electrode assembly including electrodes protruding from edges of the electrode assembly, and a pair of exterior members covering the electrode assembly, having primary sealing area and areas adjacent to the primary sealing area. The primary sealing area may be hermetically bonded and the areas adjacent to the primary sealing area are pressed to force an insulating resin applied to an inner surface of at least one of the exterior members to fill vacant spaces between the electrodes protruding from the edges of the electrode assembly. The insulating resin may be simultaneously hardened during the pressing the areas adjacent to the primary sealing area, so that the hardened insulating resin stably supports the electrodes protruding from the edges of the electrode assembly.

The insulating resin may be applied only to a designated area of the inner surface of the at least one exterior member, and the designated area may include a secondary sealing area of the at least one exterior member corresponding to an area between the primary sealing area of the at least one exterior member and the edges of the electrode assembly.

The insulating resin may include a thermosetting polymer. The thermosetting polymer may include at least one of epoxy resin, epoxy novolac resins, benzoxazines, polyimides, bismaleimides, cyanate esters, polycyanurates, vinyl ester, polyester resin, polyurethanes, polyurea/polyurethane hybrids, vulcanized rubber, bakelite, phenol-formaldehyde resin, duroplast, urea-formaldehyde, melamine resin, diallyl-phthalate (DAP), furan, and silicone. The thermosetting polymer may be in a form of composite which includes a reinforced fiber. The reinforced fiber may be made of electrically insulating material such as glass fiber. Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIGS. 5(*a*) to 5(*c*) show views illustrating a sealing process of forming an electrode case by bonding exterior members in accordance with the embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

Figure 1:
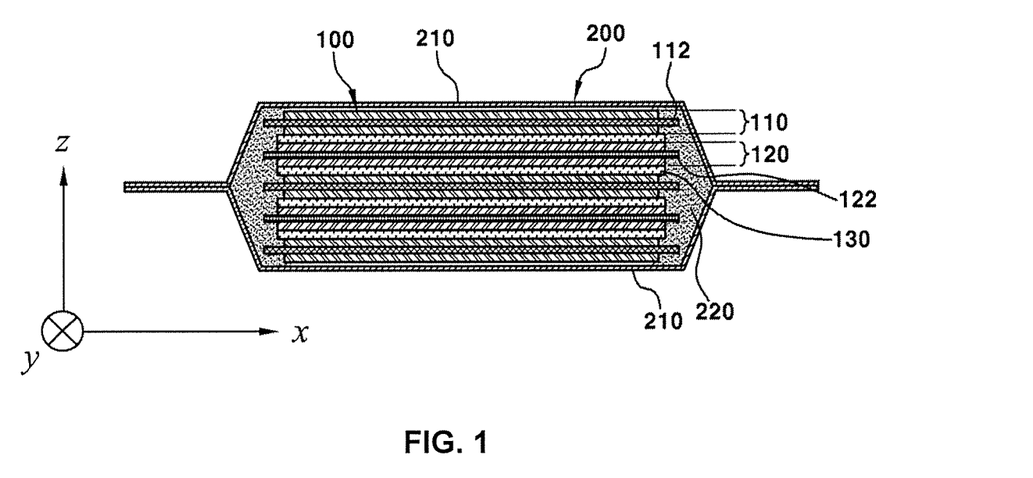
FIG. 1 shows a cross-sectional view of an all-solid-state battery in accordance with one embodiment of the present invention.
Figure 2:
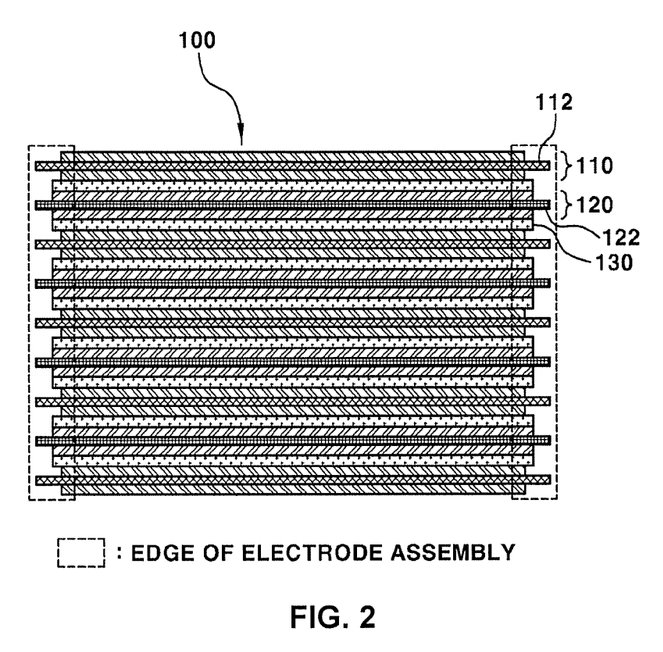
FIG. 2 shows a cross-sectional view of an electrode assembly of the all-solid-state battery in accordance with the embodiment of the present invention.

FIG. 1 shows a cross-sectional view of an all-solid-state battery in accordance with one embodiment of the present invention, and FIG. 2 shows a cross-sectional view of an electrode assembly 100 of the all-solid-state battery in accordance with the embodiment of the present invention.

As exemplarily shown in FIG. 1, an all-solid-state battery in accordance with one embodiment of the present invention includes an electrode assembly 100 formed by stacking a plurality of cathodes 110 and a plurality of anodes 120 in one direction, i.e. vertical direction, and a pouch-type electrode case 200 to receive and seal the electrode assembly 100.

The electrode assembly 100 is formed by sequentially stacking the cathodes 110 and the anodes 120 under the condition that a solid electrolyte layer 130 is interposed between each cathode 110 and each anode 120 and, in this case, the cathodes 110 having a designated size and the anodes 120 having a designated size are alternately arranged. Here, current collectors 112 and 122 of the cathodes 110 and the anodes 120 have greater surface areas than the solid electrolyte layer 130 and, in order to prevent precipitation of lithium, an application area of an electrode material (active material) of the anodes 120 is set to be greater than an application area of an electrode material (active material) of the cathodes 110.

Therefore, in the electrode assembly 100, vacant spaces (in more detail, vacant spaces between the current collectors 112 and 122) are present between the electrodes 110 and 120 at the edge parts in four directions of the electrode assembly 100.

Further, the electrode case 200 is a pouch-type case which may receive and seal the electrode assembly 100. The electrode case 200 receiving the electrode assembly 100 is sealed and thus prevents inflow of outdoor air.

The electrode case 200 is formed as a closed pouch-type case using sheet-type exterior members 210 in which an insulating resin P containing a thermosetting polymer is applied to the inner surfaces of the exterior members 210. The insulating resin includes, not limited to, epoxy resin, epoxy novolac resins, benzoxazines, polyimides, bismaleimides, cyanate esters, polycyanurates, vinyl ester, polyester resin, polyurethanes, polyurea/polyurethane hybrids, vulcanized rubber, bakelite, phenol-formaldehyde resin, duroplast, urea-formaldehyde, melamine resin, diallylphthalate (DAP), furan, silicone, and composite of any of the thermosetting resins with other electrically insulating reinforced fibers such as glass fibers. In some embodiments, the insulating resin is applied to at least one of the exterior members. In another embodiments, the insulating resin is applied to an entirety of the inner surface of the at least one of the exterior members. In another embodiments, the insulating resin is applied to the edge of the inner surface of the at least one of the exterior members. For example, the electrode case 200 may be a pouch-type case, which is formed by hermetically bonding edges of a pair of sheet-type exterior members 210 so as to receive the electrode assembly 100.

The electrode case 200 is formed as a pouch-type sealed case formed by bonding the edges of a pair of the exterior members 210 under the condition that the electrode assembly 100 is interposed between the exterior members 210 and, when the edges of the exterior members 210 are bonded, the insulating resin P applied to the inner surfaces of the exterior members 210 is forced to fill a space between the edges of the electrode assembly 100 interposed between the exterior members 210, and fills vacant spaces between the electrodes 110 and 210 at the edges and is simultaneously hardened, thereby coating the surfaces of the edges and physically supporting the electrodes 110 and 210 to stably fix the positions of the electrodes 110 and 210, simultaneously.

Here, the insulating resin P hardened while filling the vacant spaces at the edges of the electrode assembly 100 forms an insulating resin part 220 of an all-solid-state battery cell, and the insulating resin part 220 serves as an insulating layer to prevent generation of short at the edges of the electrode assembly 100 and simultaneously serves to absorb and buffer physical impact applied to the edges of the electrode assembly 100.

Figure 3:
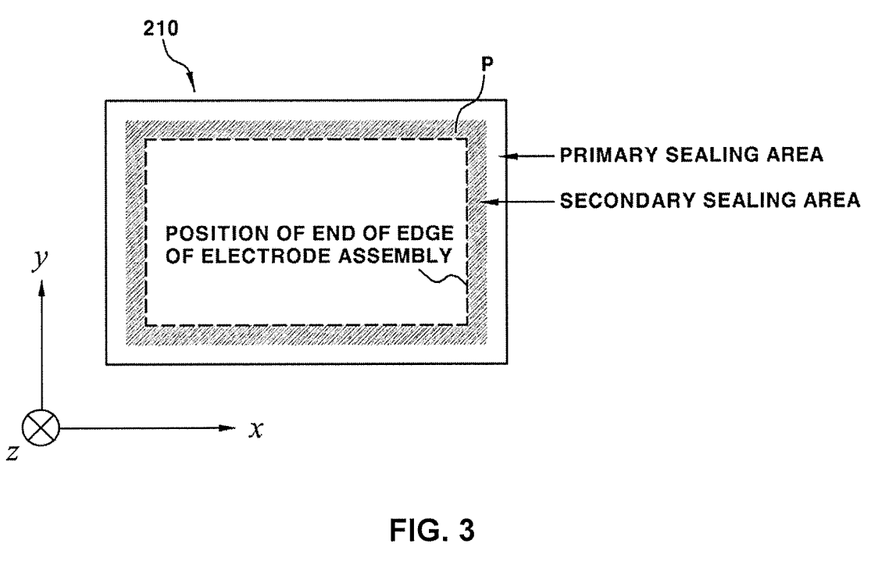
FIG. 3 shows a top view of the all-solid-state battery illustrating an application area of an insulating resin selectively coating an exterior member in accordance with the embodiment of the present invention.

Therefore, the all-solid-state battery in accordance with the present invention may fundamentally prevent generation of short at the edges of the electrode assembly 100 due to physical contact between the electrodes 110 and 120 and, for this purpose, the insulating resin P is coated to at least a designated area of the inner surface of the exterior member 210 (in more detail, a secondary sealing area of the inner surface of the exterior member 210) (with reference to FIG. 3).

Conventional all-solid-state battery is a secondary battery which includes a solid electrolyte instead of a liquid electrolyte used in a conventional lithium secondary battery. In the all-solid-state battery, since no separator film is provided between electrodes having different polarities stacked in one direction, i.e. vertical direction. When an electrode assembly is manufactured by stacking a plurality of electrodes, the edges of the electrode assembly is coated with an insulating layer for short prevention. The insulating layer is coated on each current collector or electrode of the electrode assembly and, thus, a lead time of a manufacturing process of the all-solid-state battery may be extended and difficulty in the manufacturing process may be caused.

On the other hand, if the insulating layer is omitted, there are problems, such as a staircase formed at the edges of the electrode assembly due to an application area difference of electrode active materials between the cathode and the anode and/or a high risk of short generated by physical damage caused by a pressing process when a battery cell is manufactured.

Therefore, in the present invention, when an electrode assembly 100 is sealed using sheet-type exterior members 210, an insulating resin applied to the inner surfaces of the exterior members 210 moves to the edges of the electrode assembly 100 (indicated by the broken line in FIG. 2) and thus fills vacant spaces between the electrodes 110 and 120 at the edge, thereby preventing generation of a short at the edges of the electrode assembly 100 (indicated by broken line in FIG. 2) and fixing the positions of the electrodes 110 and 120 and thus improving process workability and cell durability.

That is to say, in the present invention, when exterior members 210 are used to seal an electrode assembly 100 during a packaging process of the electrode assembly 100, the surface of the edges of the electrode assembly 100 (indicated by broken line in FIG. 2) is coated with an insulating resin applied to the inner surfaces of exterior members 210 and, thus, a conventional process of coating each current collector 112 or 122 or electrode 110 or 120 with an insulating layer 220 may be omitted and prevention of short generation at the edges of electrode assembly 100 (indicated by broken line in FIG. 2) and electrode fixation may be executed through a simple process, such as a bonding process of the exterior members 210. The above-described all-solid-state battery in accordance with the present invention is configured such that the insulating resin part 220 having electrical insulating and physical supporting functions is provided at the edges of the electrode assembly 100 during the packaging process of the electrode assembly 100 so as to fundamentally prevent short generation and, in order to coat the edges of the electrode assembly 100 with the insulating resin P (FIG. 3) without any additional coating process, the all-solid-state battery in accordance with the present invention will be manufacturing as follows.

Figure 4:
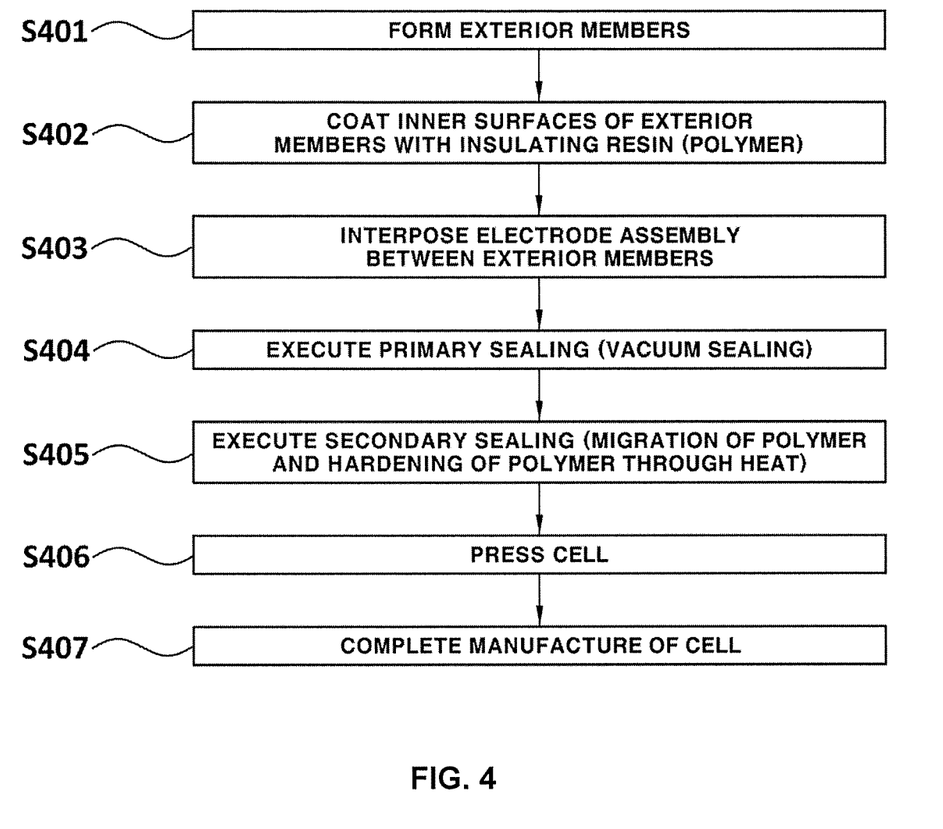
FIG. 4 shows a schematic flowchart illustrating a method of manufacturing an all-solid-state battery in accordance with one embodiment of the present invention.

First, with reference to FIG. 4, a method of manufacturing an all-solid-state battery in accordance with one embodiment of the present invention includes step S401 of forming sheet-type exterior members 210, step 402 of coating the inner surfaces of the exterior members 210 with a thermosetting insulating resin P (FIG. 3), step S403 interposing an electrode assembly 100 between a pair of exterior members 210, step 404 of primarily sealing (vacuum-sealing) the electrode assembly 100 in a vacuum state by hermetically bonding primary sealing areas of the edges of the exterior members 210, step S405 of secondarily sealing the electrode assembly 100 by pressing areas adjacent to the primary sealing areas of the edges of the exterior members 210 by applying pressure thereto, and step S406 of pressing the electrode assembly 100 by applying pressure thereto.

In the step S401 of formation of the exterior members 210, the sheet-type exterior members 210 having a designated size are formed of a flexible material, such as aluminum, and, in this case, a pair of exterior members 210 is formed so as to surround the upper and lower surfaces of the electrode assembly 100 to seal the electrode assembly 100.

In the step S402 of coating of the inner surfaces of the exterior members 210 with the thermosetting insulating resin P, the insulating resin P containing a thermosetting polymer is applied to the inner surfaces of the exterior members 210. Here, the thermosetting insulating resin P is coated on the inner surface of at least one exterior member 210 out of the pair of exterior members 210 surrounding the electrode assembly 100. Further, the insulating resin P is applied to the entirety of the inner surface of the exterior member 210 or is applied to only the edge of the inner surface of the exterior member 210 corresponding to a sealing area.

Thereafter, in step S403, the electrode assembly 100 is inserted into the pair of the exterior members 210 and, then, in step S404, the electrode assembly 100 is sealed and the pouch-type electrode case 200 is formed simultaneously by hermetically bonding the edges of the exterior members 210 through primary sealing and secondary sealing operations.

Figure 5A:
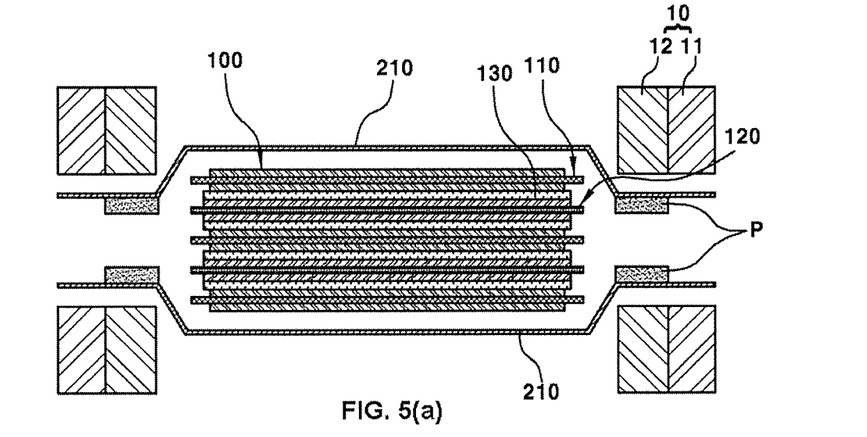
Figure 5B:
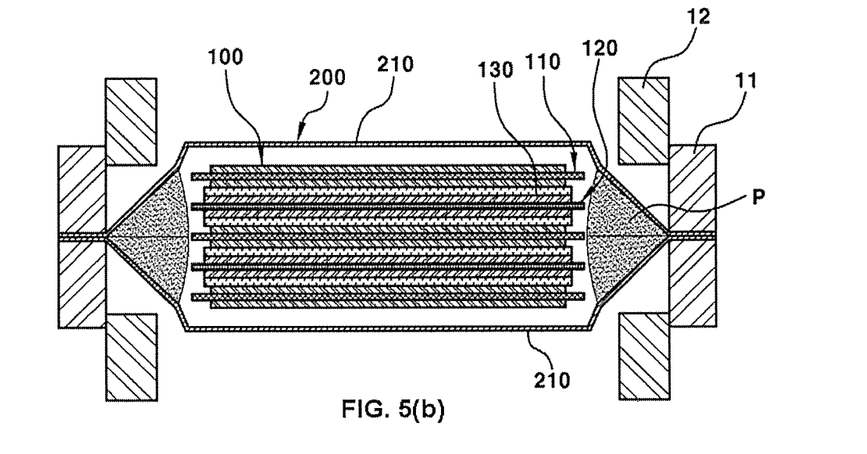
Figure 5C:
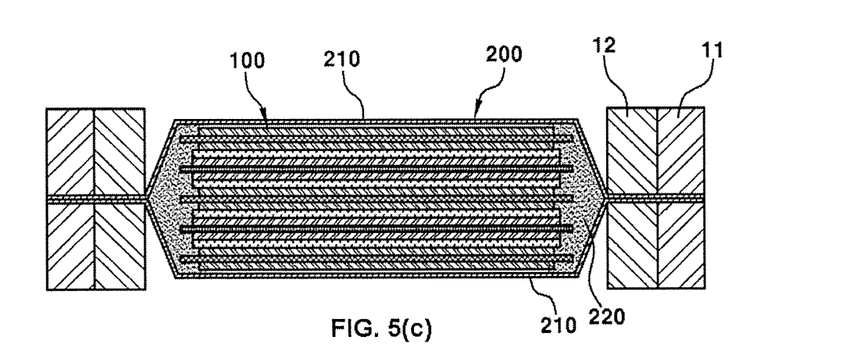

In more detail with reference to FIGS. 5(a) to 5(c), when the electrode assembly 100 is disposed between a pair of the exterior members 210 (FIG. 5(a)) and the edges of the exterior members 210 are bonded to seal the electrode assembly 100, the edges of the exterior members 210 are pressed through thermal fusion by a high-temperature sealing device (metal sealing bars) 10 and are thus bonded to seal the electrode assembly 100. Here, the electrode assembly 100 is sealed through a two-stage sealing process. In primary sealing of step 404 shown in FIG. 5(b), a vacuum is formed between a pair of the exterior members 210, between which the electrode assembly 100 is interposed, and, in secondary sealing of step S405 shown in FIG. 5(c), the insulating resin P applied to the exterior members 210 is forced to fill a space between the edges of the electrode assembly 100 and thus coats the surfaces of the electrodes 110 and 120 at the edges of the electrode assembly 100 while filling vacant spaces between the electrodes 110 and 120 at the edges of the electrode assembly 100.

That is, in the primary sealing operation of the step S404 shown in FIG. 5(b), the edges of a pair of the exterior members 210 are hermetically bonded to form the electrode case 200 receiving the electrode assembly 100 and a vacuum is simultaneously formed in the inner space of the electrode case 200 and, in the secondary sealing operation of the step S405 shown in FIG. 5(c), by pressing areas adjacent to the primary sealing areas of the edges of the exterior members 210 (i.e., secondary sealing areas close to the centers of the exterior members 210, as compared to the primary sealing areas), at a pressure, the insulating resin P coated on the secondary sealing areas of the inner surfaces of the exterior members 210 is forced into the inner space of the electrode case 200 and thus fills the vacant spaces at the edges of the electrode assembly 100. Here, the insulating resin P is hardened simultaneously with filling the vacant spaces at the edge of the electrode assembly 100, thus coating the surfaces of the electrodes 110 and 120 at the edges of the electrode assembly 100 and physically supporting the electrodes 110 and 120 at the edges of the electrode assembly 100, simultaneously.

Therefore, when the edges of the exterior members 210 are coated with the insulating resin P, the insulating resin P is applied to a designated selected area including at least the secondary sealing area of the inner surface of the exterior member 210.

That is, the insulating resin P is coated on a designated area including at least the secondary sealing area of the inner surface of the exterior member 210 (with reference to FIG. 3).

As exemplarily shown in FIG. 3 and FIGS. 5(a) to 5(c), the secondary sealing area means an area between the primary sealing area of the edge of the exterior member 210 and the edges of the electrode assembly 100 disposed between a pair of the exterior members 210 (i.e., the electrode assembly 100 received in the electrode case 200).

FIG. 3 illustrates an application area (i.e., the secondary sealing area) of the insulating resin P selectively coating the exterior member 210 in accordance with the embodiment of the present invention, and FIGS. 5(a) to 5(b) illustrate a sealing process of the all-solid-state battery using the exterior members 210 in which the insulating resin P is applied only to the secondary sealing areas of the edges of the inner surfaces of the exterior members 210.

In more detail with reference to FIG. 3 and FIGS. 5(a) to 5(c), in the primary sealing operation (FIG. 5(b)), the primary sealing areas of the edges of the exterior members 210 corresponding to the outermost parts of the exterior members 210 are bonded through fusion at a high temperature and high pressure. Here, a vacuum is formed within the inner space between a pair of the exterior members 210, in which the electrode assembly 100 is received, by removing air from the inner space.

For example, in the primary sealing operation (FIG. 5(b)), out of edge parts of the rectangular sheet-type exterior members 210 in four directions, edge parts of the exterior members 210 in one direction are bonded by fusion, both edge parts of the exterior members 210 neighboring the above edge parts are bonded by fusion, and then final edge parts of the exterior members 210 are bonded by fusion, thereby forming a vacuum in the inner space between the exterior members 210. Prior to primary sealing, the electrode assembly 100 is inserted into a pair of the exterior members 210 which are separately provided, or inserted into a pair of the exterior members 210, edge parts of which in one direction are bonded to each other by fusion.

In the secondary sealing operation (FIG. 5(c)), the secondary sealing areas of the edges of the exterior members 210 corresponding to areas inside the primary sealing areas of the exterior members 210 are bonded by pressing through fusion at a high temperature and high pressure. Here, the insulating resin P applied to the secondary sealing areas is temporarily softened by pressure and are thus forced to fill a space between the edges of the electrode assembly 100.

In the secondary sealing operation (FIG. 5(c)), all the edge parts of the exterior members 210 in four directions may be simultaneously bonded, or the edge parts of the rectangular sheet-type exterior members 210 in a selected direction may be firstly bonded and then the remaining edge parts of the exterior members 210 may be subsequently bonded.

As described above, by executing secondary sealing of the exterior members 210 after leakage of the insulating resin P is prevented through primary sealing of the exterior members 210, the insulating resin P pushed by pressure of the sealing device 100 moves only to the edges of the electrode assembly 100 located inside the edges of the exterior members 210.

Here, the insulating resin P forced to fill a space between the edges of the electrode assembly 100 coats the surfaces of the electrodes 110 and 120 and the solid electrolyte layers 130 while filling vacant spaces between the electrodes 110 and 120 at the edges of the electrode assembly 100, and is simultaneously hardened by pressure and heat from the sealing device 10 and thus physically supports the electrodes 110 and 120.

That is, the insulating resin P filling the vacant spaces at the edges of the electrode assembly 100 coats the surfaces of the edges of the electrode assembly 100 and simultaneously fixes the positions of the electrodes 110 and 120 and may thus reduce physical impact.

With reference to FIGS. 5(a) to 5(c), the sealing device 10 for the sealing process of the exterior members 210 is a kind of press device including first sealing bars 11 and second sealing bars 12. In primary sealing, the primary sealing areas of the exterior members 210 are pressed by the first sealing bars 11 and are thus bonded through fusion and, in secondary sealing, the secondary sealing areas of the exterior members 210 are pressed by the second sealing bars 12 and are thus bonded through fusion.

By sequentially executing the primary and secondary sealing operations (FIGS. 5(a) and 5(b)) of the exterior members 210 using the sealing device 10, the edges of the exterior members 210 are bonded and, simultaneously, the insulating resin P in the secondary sealing areas temporarily becomes semi-molten and is thus injected into the edges of the electrode assembly 100 using heat and pressure applied by the high-temperature first and second sealing bars 11 and 12.

Further, in pressing of the electrode assembly 100 by applying pressure thereto, the electrode assembly 100 is pressed in the stacking direction of the electrodes 110 and 120 and, thus, contact efficiency among the electrodes 110 and 120 and the solid electrolyte layers 130 is increased.

The order and the number of times of the pressing operation of the electrode assembly 100 are not limited. However, considering that, when the insulating resin P is forced to fill a space between the edges of the electrode assembly 100 and thus surrounds the surfaces of the electrodes 110 and 120 at the edges of the electrode assembly 100 in secondary sealing of the exterior members 210, physical impact may be applied by pressing of the electrode assembly 100 by applying pressure thereto may be executed after the secondary sealing operation (S406 in FIG. 4).

Further, pressing of the electrode assembly 100 by applying pressure thereto may be additionally executed before the electrode assembly 100 is interposed between a pair of the exterior members 210. Moreover, pressing of the electrode assembly 100 by applying pressure thereto may be additionally executed after the primary sealing operation of the exterior members 210.

If an all-solid-state battery cell is manufactured by coating the edges of the electrode assembly 100 with the insulating resin P using the above-described method, possibility of generation of short at the edges of the electrode assembly 100, which is the most vulnerable to physical impact, is fundamentally eliminated and, simultaneously, the all-solid-state battery cell may have advantages as follows, as compared to conventional technology in which an insulating coating layer is formed on each electrode of an electrode assembly.

1. The insulating resin P coated on the edges of the electrode assembly 100 has a physical impact absorbing function and, thus, vulnerability of an all-solid-state battery to physical impact caused by a solid material may be supplemented.

2. The insulating resin P physically fixes the electrodes 110 and 120 at the edges of the electrode assembly 100 and, thus, workability of a process of manufacturing an all-solid-state battery using the battery cell may be improved.

3. When a sealing defect of the exterior members 210 occurs, inflow of outdoor gas into the electrode assembly 100 is prevented and, thus, an abnormal reaction, such as generation of sulfuric acid gas due to inflow of outdoor gas, may be prevented.

As is apparent from the above description, in a method of manufacturing a short-preventive all-solid-state battery, a thermosetting insulating resin applied in advance to sealing areas of exterior members is injected into vacant spaces at the edges of an electrode assembly and is simultaneously hardened during secondary sealing of the exterior members, and, thus, the hardened insulating resin may stably support the electrodes protruding from the edges of the electrode assembly, thereby preventing physical contact and collision between the electrodes and fundamentally preventing generation of short caused thereby.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a short-preventive all-solid-state battery, comprising:
   applying an insulating resin to an inner surface of at least one of a pair of exterior members; and
   disposing an electrode assembly between the pair of exterior members and bonding edges of the exterior members so as to seal the electrode assembly, said disposing includes:
   primarily sealing the electrode assembly by hermetically bonding a primary sealing area of the edges of the pair of exterior members so as to form an electrode case which receives the electrode assembly; and
   secondarily sealing the electrode assembly by pressing areas adjacent to the primary sealing area of the exterior members bonded in the primarily sealing,
   wherein, in the secondary sealing, the insulating resin, applied to the area adjacent to the primary sealing area of the at least one of the pair of exterior members, fills a space between edges of the electrode assembly and spaces between electrodes at the edges of the electrode assembly.

2. The method of claim 1, wherein the insulating resin is applied to the entirety of the inner surface of the at least one exterior member or applied to the edge of the inner surface of the at least one exterior member.

3. The method of claim 1, wherein the insulating resin is applied only to a designated area of the inner surface of the at least one exterior member, and the designated area includes a secondary sealing area of the at least one exterior member corresponding to an area between the primarily sealing area of the at least one exterior member and the edges of the electrode assembly.

4. The method of claim 1, further comprising pressing the electrode assembly by applying pressure thereto in an electrode stacking direction, after the disposing the electrode assembly between the pair of exterior members and bonding the edges of the exterior members.

5. The method of claim 1, wherein the insulating resin includes a thermosetting polymer.

* * * * *